United States Patent [19]

Winn

[11] 4,344,631
[45] Aug. 17, 1982

[54] PRESSURE INSENSITIVE LIP SEAL

[75] Inventor: Leo W. Winn, Schenectady, N.Y.

[73] Assignee: Mechanical Technology Incorporated, Latham, N.Y.

[21] Appl. No.: 207,907

[22] Filed: Nov. 18, 1980

[51] Int. Cl.³ .................... F16J 15/32; F16J 15/40
[52] U.S. Cl. .................................. 277/29; 277/27; 277/135; 277/153
[58] Field of Search ............... 277/3, 27, 135, 29, 277/152, 153

[56] References Cited

U.S. PATENT DOCUMENTS

| 2,177,441 | 10/1939 | Pesarese | 277/152 |
| 3,443,814 | 5/1969 | Dahlheimer | 277/27 |
| 3,894,741 | 7/1975 | McHugh | 277/27 |
| 4,284,280 | 8/1981 | Bertram et al. | 277/27 |

FOREIGN PATENT DOCUMENTS

| 804393 | 4/1951 | Fed. Rep. of Germany | 277/153 |
| 2643769 | 3/1978 | Fed. Rep. of Germany | 277/153 |
| 55-47050 | 4/1980 | Japan | 277/153 |
| 7713030 | 5/1977 | Netherlands | 277/152 |
| 648739 | 1/1951 | United Kingdom | 277/153 |
| 1412310 | 11/1975 | United Kingdom | 277/153 |
| 1455166 | 11/1976 | United Kingdom | 277/152 |
| 667744 | 6/1979 | U.S.S.R. | 277/153 |

Primary Examiner—Robert S. Ward, Jr.
Attorney, Agent, or Firm—Joseph V. Claeys; Arthur N. Trausch, III

[57] ABSTRACT

A lip seal for preventing the mixing of seawater with an oil cavity around a marine stern tube includes an annular radial flange attached to one end of an axially extending bushing which is encircled by a garter spring. An axially extending foot projects from the bushing into the oil cavity and includes a hydrodynamic profile on its inner surface. A pocket is formed in the sealing face of the bushing and is pressurized with oil by the hydrodynamic profile on the bushing. The pressurized oil pocket balances the water pressure on the outside of the seal, and the hydrodynamic profile forms a fluid film which lubricates the seal and provides the balancing pressure for the pocket. A series of vents can be provided to vent excess oil pressure in the pocket to prevent leakage of oil out of the pocket into the water.

3 Claims, 2 Drawing Figures

PRESSURE INSENSITIVE LIP SEAL

BACKGROUND OF THE INVENTION

This invention relates to rotating shaft seals, and more particularly to an advanced stern tube seal for maritime applications.

The current rate of stern tube failure is undesirably high and very costly to the shipping industry. A sudden stern tube failure, for example, in a large oil tanker, can cause a catastrophic financial loss to the owners if it occurs at an inopportune time in the tanker operation. Such as when it is fully loaded and far from port.

The failure of the stern tube lip seal is primarily due to the material incompatibility between the lip seal and the stern tube liner. This incompatibility results in excessive liner and seal wear. In normal lip seals, there are no provisions made for proper lubrication nor for reduction in the sensitivity of the lip seal contact zone to the pressure differential applied across it. Therefore, it is common for the lip seal to fail on fully loaded vessels when the pressure differential across the seal is at its maximum and when the seal failure has the most severe consequence.

The conventional lip seal configuration includes a rubber lip held against the rotating shaft by a garter spring. The garter spring applies a preload to the contact zone between the lip and shaft seal. The aft lip seal normally is subjected to water pressure on one side and an oil pressure on the other side. Ideally, the oil pressure matches the water pressure, and the contact point between the lip and the shaft separates the oil from the water. However, the pressure within the water zone is usually somewhat higher than within the oil zone, and is subject to fluctuation. As the pressure differential across the lip increases, the lip bends and conforms to the shaft. This process is more pronounced in the forward seal where almost the full pressure differential is applied in the form of oil pressure, and the unloaded side of the lip is in the air.

High pressure differences cause an increase in the contact area over which the full pressure differential acts, which results in an increase in the frictional force and an increase in heat generation. This in turn accelerates the wear rate. Excessive wear in the contact zone results in leakage of water into the oil, oil into the water, or oil into the hull depending upon seal location.

Various techniques have been proposed to balance the oil pressure to the water pressure, however, these techniques are usually too sophisticated for the rough environment aboard ship, or are not sensitive enough to follow the pressure fluctuations at the stern tube seals, caused by waves, ship pitching, draft changes, axial vibrations, hull vibrations, etc.

SUMMARY OF THE INVENTION

Accordingly, it is an object of this invention to provide a lip seal for a rotating shaft which displays little sensitivity to the pressure differential across it and thus permits the lip seal to operate at lower contact pressure values over a wider range of pressure fluctuation. It is another object of this invention to incorporate into the lip seal a means for introducing lubrication and a means for generation of a hydrodynamic fluid film in the contact zone between the seal and the shaft to greatly reduce the wear rate.

These objects are achieved in the preferred embodiments of the invention by a lip seal having an annular flange extending radially to an annular axially extending bushing attached to the flange at one end and urged into contact with the shaft by a garter spring. The bushing has a hydrodynamic profile formed on the surface in engagement with the shaft. This hydrodynamic profile, coacting with the rotating shaft, generates a hydrodynamically pressurized fluid film between the bushing and the shaft which lubricates the seal interface and balances the pressure on the seal interface. The pressure of the hydrodynamic fluid film is a function of the gap in the seal interface which, in turn, is a function of the pressure drop across the seal. Therefore, the fluid film pressure tends to follow the water pressure to provide a self-balancing feature.

DESCRIPTION OF THE DRAWING

The invention and its many attendant objects and advantages will become better understood upon reading the following detailed description of the preferred embodiment in conjunction with the following drawings wherein.

DETAILED DESCRIPTION OF THE PREFERRED EMBODIMENT

Figure 1:
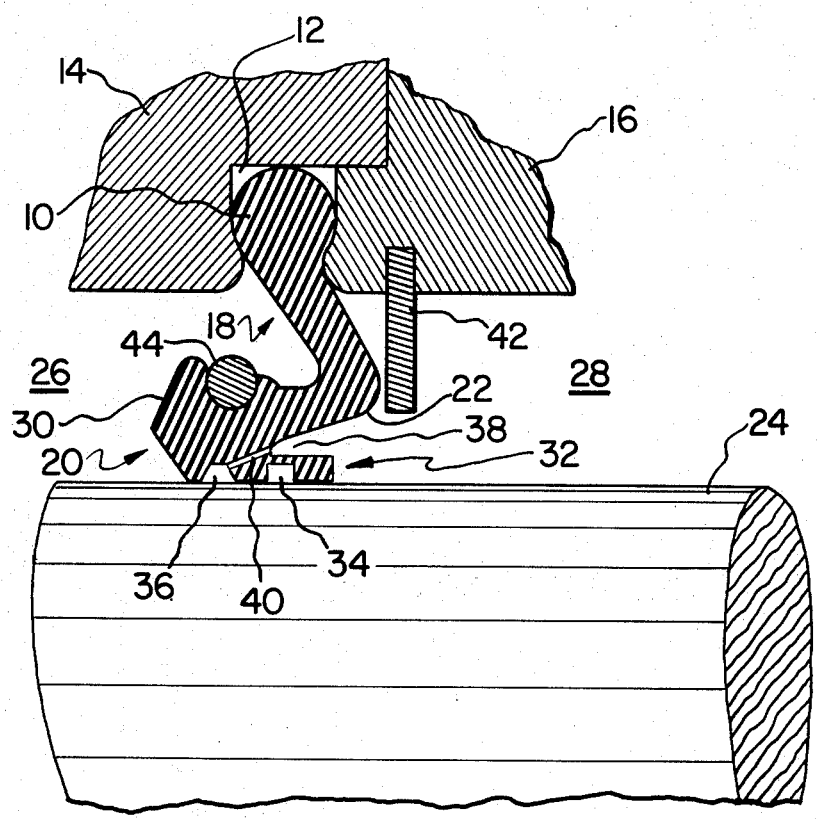
FIG. 1 is a sectional elevation of the seal made in accordance with this invention.

Referring now to the drawings wherein like reference characters designate identical parts, and more particularly to FIG. 1 thereof, a marine propeller shaft seal is shown having a bead 10 clamped in a recess 12 of a housing 14 by a clamping ring 16. The bead 10 forms the radial outer edge of a flange 18 which extends from the bead 10 in a generally radial inner direction to its junction with a bushing 20 at an elbow 22. The radial inner surface of the bushing 20 contacts a rotating propeller shaft 24 of a ship and provides a seal against entrance of seawater from the zone outside of the seal in the region indicated at 26 to the zone inside of the seal at the region indicated at 28. The region indicated at 28 is normally filled with oil for a purpose which will appear presently and will be denoted oil cavity 28.

The bearings which support the shaft 24 are in the oil cavity 28. It would be detrimental to bearing life and operation if water were to mix with the oil lubricating these bearings. Therefore, it is important that the seal prevent entrance of the water into the oil cavity 28. For this reason, it is a common practice to provide multiple seals in series between the water zone 26 and the shaft bearing so that failure of one seal will not result in immediate entrance of water into the bearing oil cavity. Nevertheless, seal failure remains a common occurrence and contributes to enormous losses to the maritime industry.

I believe that seal failure is primarily a consequence of unbalanced pressure across the seal which is manifested as high pressure engagement of the lip seal with the shaft surface. This engagement is an intimate contact between incompatible materials and results in the generation of heat which is a direct function of the pressure drop across the seal. Thus, when the vessel is most heavily loaded and the draft is greatest, the pressure drop across the seal is highest and the heat generation at the seal interface most intense. When the seal is new, the lip is soft and pliant and forms a good seal with the shaft; however, age and heat generation causes the lip to become dry and brittle, and to develop cracks, blisters, and other distortion which permits the leakage of oil and water through the seal interface.

Figure 2:
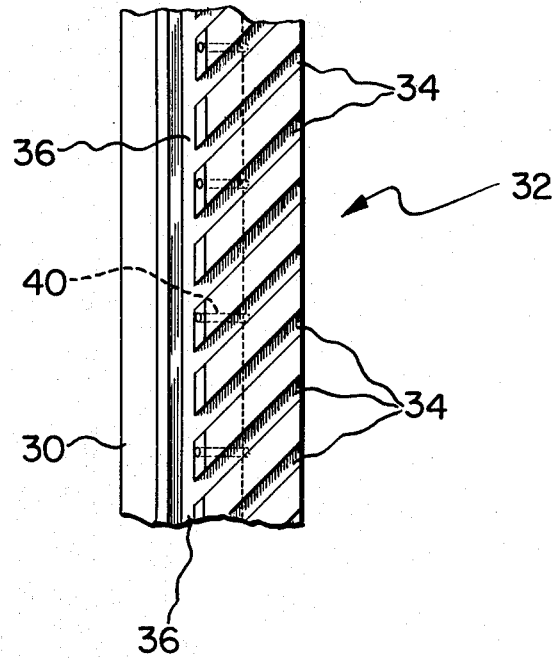
FIG. 2 is a partial plan view of the seal surface of the seal shown in FIG. 1.

This invention precludes this failure mode by creating a fluid film in the seal interface which lubricates the seal and provides a pressure cushion to balance the water pressure on the outside of the seal. This embodiment provides this function by forming the bushing 20 into a body 30 and an integrally attached foot 32 which extends from its attachment to the body 30 inwardly into the oil cavity 28. The radial inner surface of the foot 32 is formed with a hydrodynamic profile such as shown in FIG. 2 to pump oil from the oil cavity 28 outwardly toward the water zone 26. The hydrodynamic profile illustrated herein is a herringbone pattern of diagonally extending grooves which coact with the moving surface of the rotating shaft 24 to pump oil from the cavity 28 through the grooves 34. An annular pocket 36 is formed in the radial inner surface of the body 30 adjacent to the junction of the foot 32 and the body 30, and communicates with the grooves 34 of the herringbone hydrodynamic profile on the surface of the foot 32. The pocket 36 acts as a pressure plenum for the pumping herringbone spiral or straight radial grooves 34, and the pressure cushion in this pocket 36 balances the water pressure on the outside zone 26 of the seal.

An annular notch 38 is defined between the body 30 and the foot 32. The notch 38 is closed at its axial end at the junction of the foot 32 and the body 30, and opened at its axial inner end communicating with the oil cavity 28. A series of ducts 40 extend through the body 30 between the pocket 36 and the notch 38 to provide a fluid flow passage for oil in the pocket 36 when the pressure therein exceeds the water pressure in the zone 26.

In operation, the water pressure in the zone 26 is exerted against the radial outside surface of the body 30 and against the outside face of the flange 18. The force on the flange 18 is borne by a radially extending stop 42 attached to the clamp ring 16, and the water pressure force on the body 30 is assisted by a garter spring 44 lying in an annular groove around the outside of the body 30 to assure sealing contact between the seal and the shaft 24 when the shaft is not rotating and when the vessel is lightly loaded. When the vessel is operating, the shaft 24 is rotating in the speed range normally of 95 to 120 rpm. The hydrodynamic profile on the foot 32 generates a pressurized fluid film between the radial inner surface of the foot and the shaft. It also provides a pumping action into the pocket 36 which pressurizes the pocket and provides a fluid cushion between the shaft and the seal. The pressure of the fluid film between the seal and the shaft is a function of the gap in that interface, increasing with decreasing gap. Therefore, when the water pressure on the seal is greatest because of transient variations in water pressure created by the propeller, or because of the deeper draft of the vessel when it is fully loaded, the gap at the seal interface will be smaller and the pressure will be greater, thereby automatically compensating for the higher water pressure acting on the seal and providing a greater pressure in the oil cushion which automatically balances against the greater water pressure on the outside of the seal. To assure that the oil does not leak into the water, the ducts 40 can be designed to open when the pressure against the body 30 is the greatest. This can be done, for example, by making the ducts in the form of narrow slits which open when the material of the body is compressed radially and which close when the material is radially relaxed.

The seal disclosed here thus provides a seal for a marine propeller shaft which is self-lubricating and self-balancing. It will give extended life service compared to the seals presently available and will do so in a simple, uncomplicated structure which requires no attention by shipboard personnel and no complicated and sophisticated maintenance systems. It is inexpensive and reliable, and solves a serious long-standing problem in the industry.

Obviously, numerous modifications and variations of the disclosed embodiment will occur to those skilled in the art in the light of the foregoing disclosure. For example, the invention also applies to other equipment where oil is sealed against a rotating shaft at moderate speeds and pressure differentials. Therefore, it is expressly to be understood that these modifications and variations, and the equivalents thereof may be practiced while remaining within the spirit and scope of the invention, as defined in the following claims, wherein I claim:

1. A lip seal for dynamically sealing a low pressure cavity against entrance of a variable higher pressure fluid between said seal and a rotating shaft, comprising:
    a housing within which said shaft rotates;
    an annular flange extending generally radially and having a radially outside edge which is clamped to said housing and a radially inner edge;
    an annular, axially extending resilient bushing having a proximate end attached to said radially inner edge of said flange and a distal end;
    an annular foot integrally attached to said distal end of said bushing and extending axially therefrom into said low pressure cavity;
    biasing means urging said distal end of said bushing and said foot into contact with the said shaft;
    a radially inward facing surface on the bushing and said foot adapted to engage said shaft in a sealing relationship;
    a hydrodynamic profile formed in said inwardly facing surface and arranged to generate a pressurized fluid film between said surface and said shaft, which pressure is a function of the variable higher pressure exerted on the radially outward face of said bushing, whereby the fluid film pressure compensates the variable higher pressure so as to maintain said sealing relationship;
    an annular pocket located on the axial side of said hydrodynamic profile nearest said variable higher pressure fluid and adjacent the junction of said foot and bushing for providing a pressurized oil containment plenum for said seal; and
    duct means extending through said bushing and providing communication between said annular pocket and said oil cavity for relieving excess pressure in said pocket means.

2. The seal defined in claim 1, wherein said hydrodynamic profile includes a herringbone series of grooves extending between the edge of said foot in said pressure cavity to said pocket.

3. The seal defined in claim 1 or 2, wherein said shaft is a marine propeller and said variable higher pressure fluid is sea water and said low pressure fluid is oil.

* * * * *

UNITED STATES PATENT AND TRADEMARK OFFICE
CERTIFICATE OF CORRECTION

PATENT NO. : 4,344,631
DATED : August 17, 1982
INVENTOR(S) : Leo W. Winn

It is certified that error appears in the above-identified patent and that said Letters Patent are hereby corrected as shown below:

Column 1, line 4, insert the following sentence:

--The Government of the United States has rights to this invention pursuant to Contract No. 6-38054 awarded by the United States Department of Commerce.--

Signed and Sealed this

Fourteenth Day of December 1982

[SEAL]

Attest:

GERALD J. MOSSINGHOFF

Attesting Officer

Commissioner of Patents and Trademarks